United States Patent [19]

Nelson

[11] Patent Number: 5,619,955
[45] Date of Patent: Apr. 15, 1997

[54] HARNESS GRIPPING AID FOR TANDEM RIDERS

[75] Inventor: Randall J. Nelson, Jordan, Minn.

[73] Assignee: Stone Products, Inc., Prior Lake, Minn.

[21] Appl. No.: 496,451

[22] Filed: Jun. 29, 1995

[51] Int. Cl.⁶ .................................................. A62B 35/00
[52] U.S. Cl. ............................................................ 119/857
[58] Field of Search ........................................ 119/769, 770, 119/857, 907; 434/253, 254, 255; 482/69; 2/311

[56] References Cited

U.S. PATENT DOCUMENTS

| | | | |
|---|---|---|---|
| D. 339,216 | 9/1993 | Evans | D29/11 |
| 2,643,803 | 6/1953 | Gates | 119/857 X |
| 3,053,230 | 9/1962 | Klickstein et al. | 119/857 |
| 3,487,474 | 1/1970 | De Meo | 2/311 |
| 3,533,107 | 10/1970 | Raneri et al. | 2/93 |
| 3,562,812 | 2/1971 | Greggains | 2/94 |
| 3,564,616 | 2/1971 | Battaglia | 2/311 |
| 3,840,902 | 10/1974 | McNeill | 2/311 |
| 3,896,499 | 7/1975 | Kelly | 2/311 |
| 4,028,742 | 6/1977 | Marquis | 2/305 |
| 4,273,215 | 6/1981 | Leggett | 119/857 X |
| 4,324,205 | 4/1982 | Goldmacher | 2/300 |
| 4,411,222 | 10/1983 | Wolfson | 2/300 |
| 4,429,419 | 2/1984 | Snyder | 2/102 |
| 4,625,334 | 12/1986 | Proffer | 2/1 |
| 5,081,719 | 1/1992 | Donnelly | 2/311 |
| 5,289,896 | 3/1994 | Giglio | 182/3 |
| 5,356,355 | 10/1994 | Campbell | 482/43 |
| 5,388,551 | 2/1995 | Martusciello | 119/770 |
| 5,435,272 | 7/1995 | Epstein | 119/770 |
| 5,476,770 | 12/1995 | Gwon et al. | 119/770 |

*Primary Examiner*—Robert P. Swiatek
*Assistant Examiner*—Yvonne Renée Abbott
*Attorney, Agent, or Firm*—Haugen & Nikolai, PA

[57] ABSTRACT

A device for providing a gripping aid for the tandem passenger of a vehicle is described. The device includes a harness worn by the operator of the vehicle. The harness is secured around the upper region of the operator's torso, and the gripping handles are attached to the harness such that the passenger can be positioned closer to the operator while comfortably gripping the handles. An adjustable, quick release clasp allows the operator to quickly put on, remove, and adjust the harness.

7 Claims, 5 Drawing Sheets

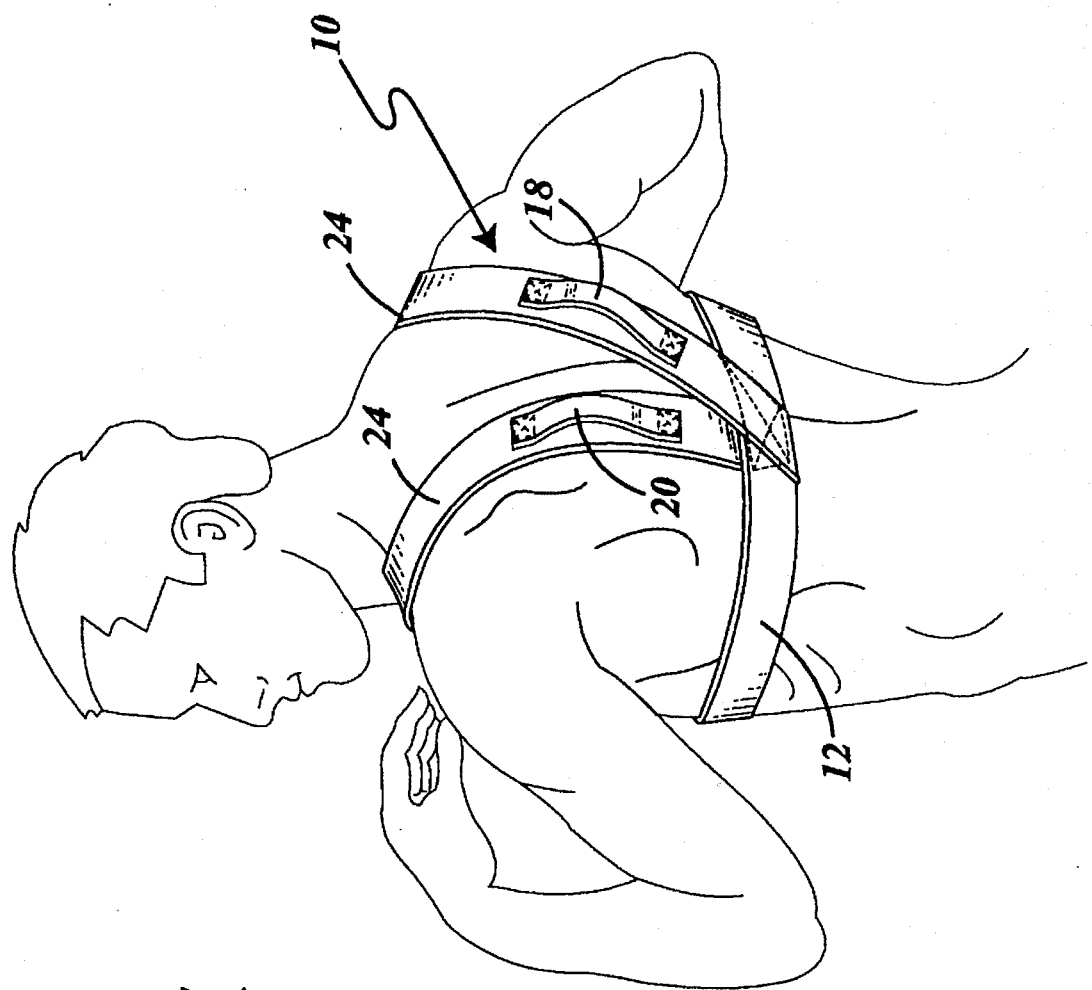

HARNESS GRIPPING AID FOR TANDEM RIDERS

BACKGROUND OF THE INVENTION

I. Field of the Invention

This invention relates generally to a device that provides a gripping aid to the passenger of a vehicle riding in tandem. More particularly, this invention relates to a harness that is worn by the operator of a vehicle, wherein the harness has handles attached thereto, and which is secured to an upper portion of the operator's torso, thereby providing stability of the harness when gripped by the passenger.

II. Discussion of the Related Art

The popularity of passengers riding in tandem on motorcycles, snowmobiles, All Terrain Vehicles (ATVs), and similar open vehicles has increased over the years. Typically, a tandem passenger will hold onto the seat, luggage rack or any other structure, including the operator of the vehicle to assist in maintaining balance while riding on the vehicle. These structures do not provide sufficient leverage to maintain the passenger's balance, when the vehicle is negotiating a sharp turn, rough terrain or the like. Further, when the passenger is a child, the child may not be able to safely reach and grip any of these structures. Also, the child's arms may not be long enough to adequately encompass or grasp the operator. Garments with handles have been devised for use by the operator of a vehicle, wherein the handles provide a better gripping surface for the passenger. While the garments devised provide handles, they may be uncomfortable, bulky, unstable, or uneconomical.

In U.S. Pat. No. 4,324,205 (the '205 patent) a safety harness is described comprising two shoulder straps, rigid handles attached to the shoulder straps and a waist belt. Although the '205 patent recognizes that positioning the handle in the mid to upper torso region increases the passenger's awareness of the operators movements, the shoulder straps have loops formed on the ends of each strap, wherein the belt freely slides through the loops of the shoulder straps. When the passenger pulls on one or both of the handles, the straps may slide over the belt in the direction of the force. This instability in the harness may cause the passenger's balance to be compromised, thereby increasing the risk of falls and injury. Therefore, a need exists for a harness having secure shoulder straps, which minimize a shift in the harness when the passenger pulls on the harness.

Likewise, in U.S. Pat. No. 4,429,419 (the '419 patent) a safety garment is disclosed comprising a vest having two series of loops parallely aligned, whereby straps slide through the loops and handles are slidingly engaged with the straps. The vest may not be comfortable to wear in warm weather and further may be difficult to wear over bulky clothes worn in cold weather. Also, the handles allow for reversible displacement in the transverse direction. The reversible displacement creates an instability in the harness when the passenger is gripping the handles and leaning at the same time. This instability may cause the passenger's balance to be compromised, increasing the risk of falls and injury. Therefore, a need exists for a stable harness with stationary handles.

The Wolfson patent, U.S. Pat. No. 4,411,222 describes a safety apparatus for passengers on vehicles comprising a waist belt having handles attached to the belt. When the passenger pulls on the handles attached to the waist belt, a strain is transposed to the lower back region of the driver. Also, the upper torso and shoulder movement of the operator is not communicated to the passenger. Further, the position of the handles requires the passenger to sit back and away from the operator in order to comfortably grip the handles. The distance the passenger is positioned from the operator affects the amount of total forces exerted by the passenger on the handle. Also, without shoulder straps the waist belt would have a tendency to slip down toward the lower torso region of the operator. Additionally, the handles as described are not compact, but instead are bulky. Therefore, a need exists for a compact harness that allows the passenger to sit proximate the operator while comfortably holding the handles of the harness, wherein the upper torso movements of the operator are communicated to the passenger.

In U.S. Pat. No. 5,289,896 (the '896 patent) there is described a harness for motorcyclists and the like that adjusts from the back. The harness is comprised of two independent shoulder straps each having a handle attached thereto, a waist strap, and upper and lower back straps. The shoulder straps are spaced apart an attach to the waist belt. By extending the shoulder straps to the waist, an instability in the harness is created. The addition of the upper and lower back straps, attempt to stabilize the shoulder straps. The '896 patent describes adjusting the upper and lower back straps and the buckle of the waist belt from the back, thereby requiring a second person to adjust the harness. Also, by attaching the shoulder straps to a waist belt, the forces applied by the passenger to the harness are directed towards the shoulders and lower back of the operator. Therefore, a need exists for an adjustable harness, that reduces the amount of stress to the lower back, and which is stable when the passenger applies a force to the handle while leaning towards a side of the vehicle.

The present invention overcomes these and other disadvantages by providing a simple, compact and economical harness that increases the passengers awareness of the operators movements, thereby assisting the passenger to move in unison with the operator. One end of each shoulder strap is attached to the harness at a central midpoint of the torso belt, thereby stabalizing the shoulder straps and directing the forces applied by a passenger against the harness to the upper torso region of the operator. Also, the torso belt is worn around the upper torso region rather than the waist of the operator, further stabilizing the harness when a force is exerted on the handles.

SUMMARY OF THE INVENTION

The problems alluded to above are solved in accordance with the present invention by providing a harness that comprises a torso belt, an adjustable clasp which holds the opposing ends of the torso belt together, and shoulder straps having handles attached thereto.

Without limitation, in the preferred embodiment, the clasp is of a conventional type, allowing a length of the torso belt to be adjusted and further is preferably of a quick release type. The torso belt and shoulder straps are sized to snugly fit the operator, wherein the torso belt extends around the upper torso region. The straps retain the torso belt in this region and further provide a gripping surface for the passenger. When the passenger is gripping the handles, the handles are positioned such that the passenger may sit close to the operator or sit away from the operator while comfortably holding onto the handles, thereby reducing the amount of strain to the operator. Also, a shorter shoulder strap attached to the torso belt extending around the upper torso region reduces the strain against the operators lower and mid torso region.

It is accordingly a principal object of the present invention to provide a harness that provides a gripping aid for tandem passengers of a motor vehicle that is simple, efficient and compact.

Another object of the present invention is to provide a harness that reduces the amount of strain on the lower back of the operator when the handles are being pulled.

Still another object of the present invention is to provide a quick release adjustable harness that is light weight and compact.

Yet another object of the present invention is to provide a harness that remains stable when the passenger applies a force on the handles while leaning toward a side of the vehicle.

These and other objects and advantages as well as these and other features will become apparent to those skilled in the art from the following detailed description of a preferred embodiment of the invention, especially when considered in conjunction with the accompanying drawings in which like numerals in the several views refer to corresponding parts.

DESCRIPTION OF THE DRAWINGS

FIG. 5 is a partial sectional perspective view of the harness attached to an operator's upper torso region.

DETAILED DESCRIPTION OF THE PREFERRED EMBODIMENT

Figure 1:
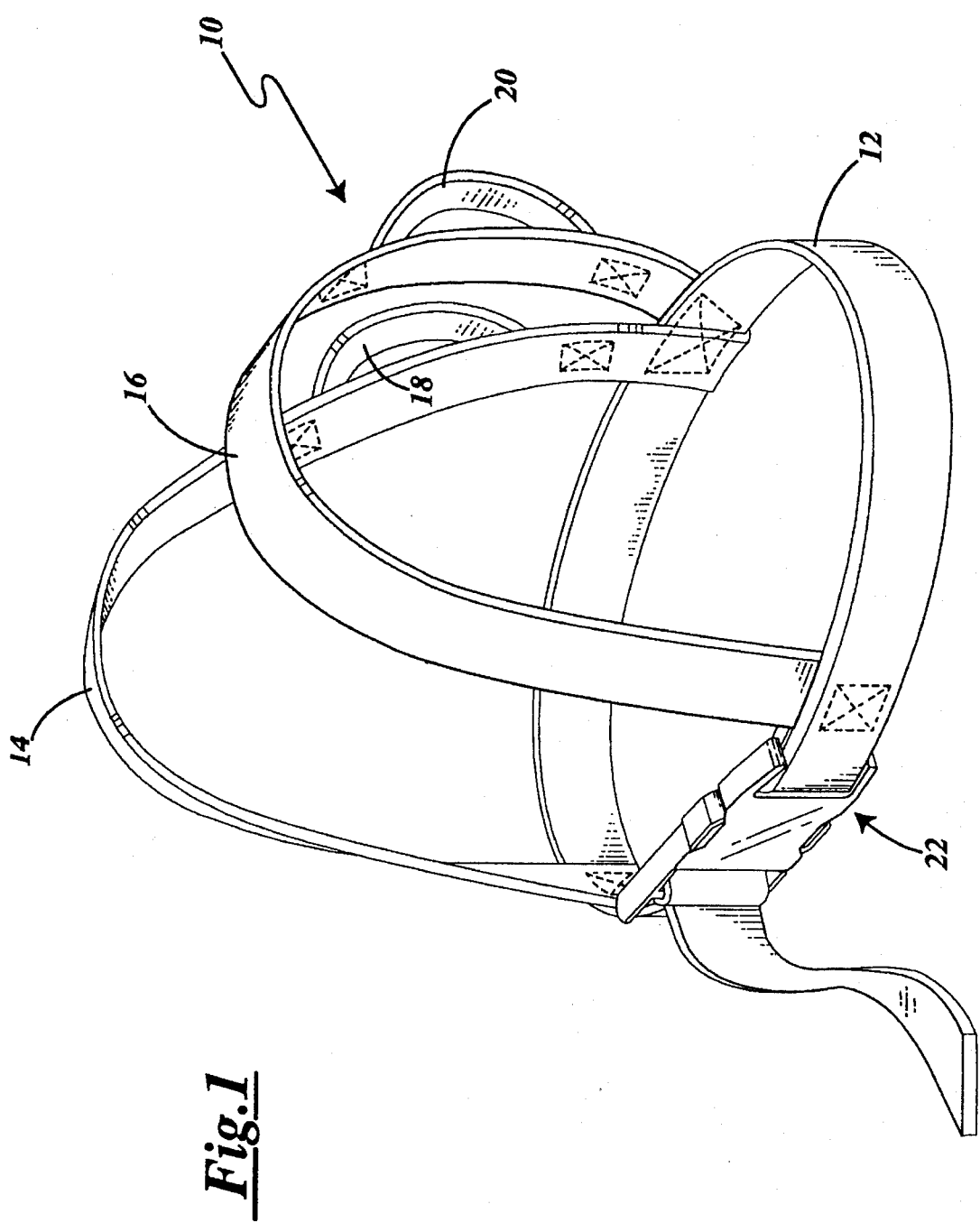
FIG. 1 is a perspective view of the harness gripping aid of the present invention.

Referring first to FIG. 1, there is shown generally a harness gripping aid 10. The harness 10 consists of a torso belt 12, a right shoulder strap 14, a left shoulder strap 16, a right handle 18, a left handle 20, and a clasp 22. The right and left shoulder straps 14 and 16 may alternatively consist of a single shoulder strap 24 (see FIGS. 2 and 3), wherein the strap 24 is attached to the torso belt 12 at approximately the torso belt 12 and strap's midpoints 26 and 28. Each end 30 and 32 of strap 24 is attached proximate to an associated end of the torso belt 12, thereby forming a first and second shoulder strap 14 and 16.

Without limitation, the torso belt 12, the right and left shoulder strap 14 and 16 and the right and left handle 18 and 20 are preferably formed from a nylon webbing. Those skilled in the art will recognize that other suitable materials may be substituted, however, nylon webbing is preferred. The use of nylon webbing allows the harness to be folded into a small compact package when not in use, and further provides a durable, high tensile strength harness. Also, the nylon webbing may be stitched together at the points of attachment, providing a durable bond between two pieces of stitched webbing. Without limitation, rivets or other conventional fasteners may alternatively be used to attach the webbing.

The length of torso belt 12 is sized, wherein the belt 12 snugly fits around the upper region or chest of the driver's torso (see FIG. 5). Also, the shoulder straps 14 and 16 are sized such that the torso belt 12 is retained around the upper region of the driver's torso. Further, the shoulder straps 14 and 16 hold the torso belt 12 in place, minimizing the slippage of the belt 12 towards the user's waist.

Figure 2:
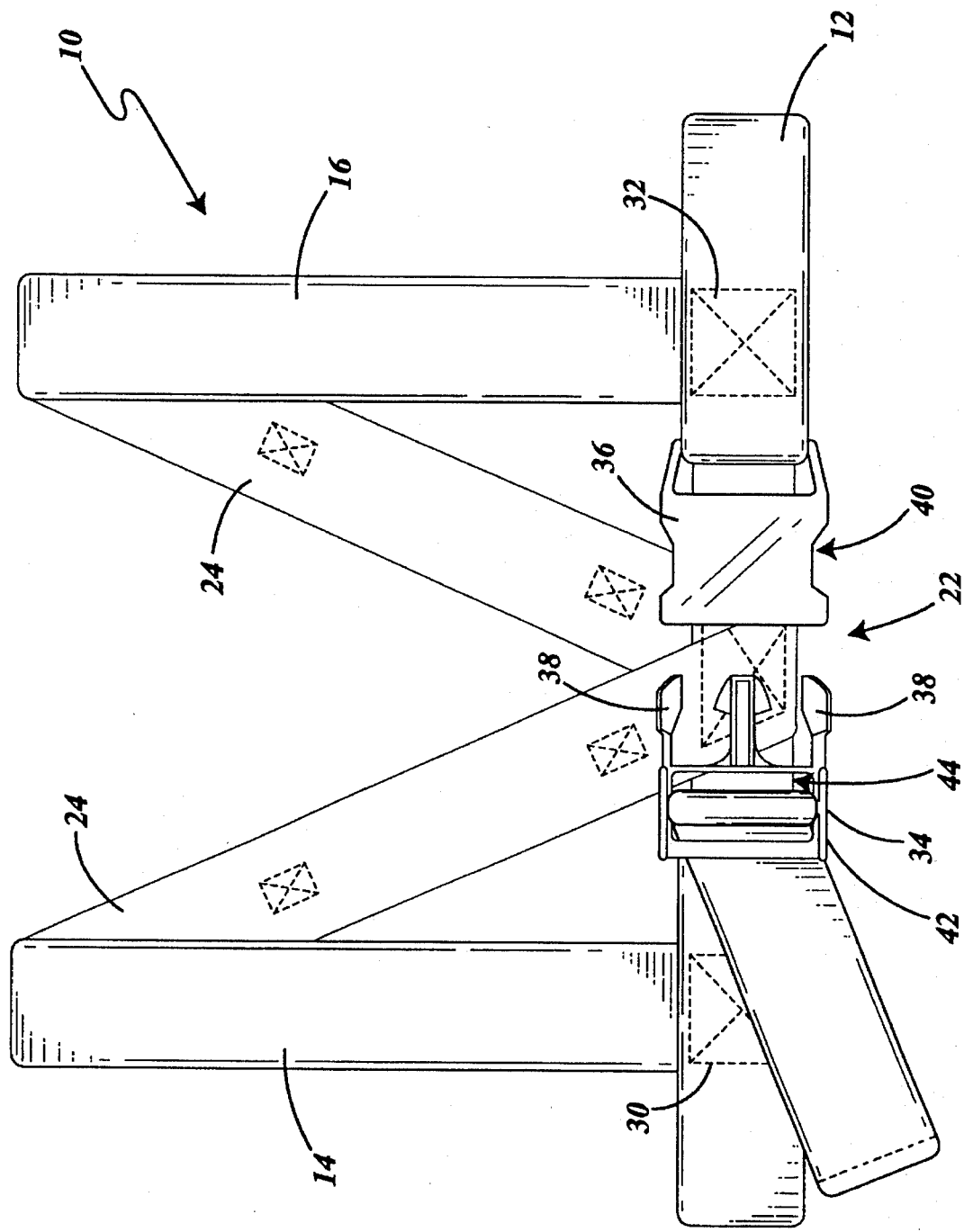
FIG. 2 is a front elevational view of the harness of the type shown in FIG. 1.

Referring next to FIG. 2, a conventional adjustable, quick release clasp is shown attached to the torso belt 12. The clasp is preferably constructed from nylon 66, however, those skilled in the art will recognize that other suitable materials may be substituted. The male 34 and female 36 halves of the clasp are shown separated in FIG. 2 for illustrative purposes. The male halve 34 of the clasp snaps into the female halve 36. Hooks 38 formed on the male halve 34 snap into slots 40 formed in the female halve 36, thereby retaining the male 34 and female 36 halves together, until the user simultaneously bends the hooks 38 away from the slots 40, thereby releasing the male halve 34 from the female halve 36.

The male halve 34 of clasp 22 is shown having one end of the torso belt 12 threaded around a bar 42 extending through an opening 44 in the male halve 34. The torso belt 12 may be adjusted by varying the length between the midpoint 26 of the torso belt and the male halve 34 of the clasp 22. Once adjusted, the torso belt 12 is tightened around bar 42. The other end of the torso belt 12 is shown attached to the female halve 36 of the clasp 22. Those skilled in the art will recognize that the end of the torso belt 12 attached to the female halve 36 of the clasp 22 may also include an opening 44 and bar 42 to allow adjustment in the effective length of the torso belt 12.

Figure 3:
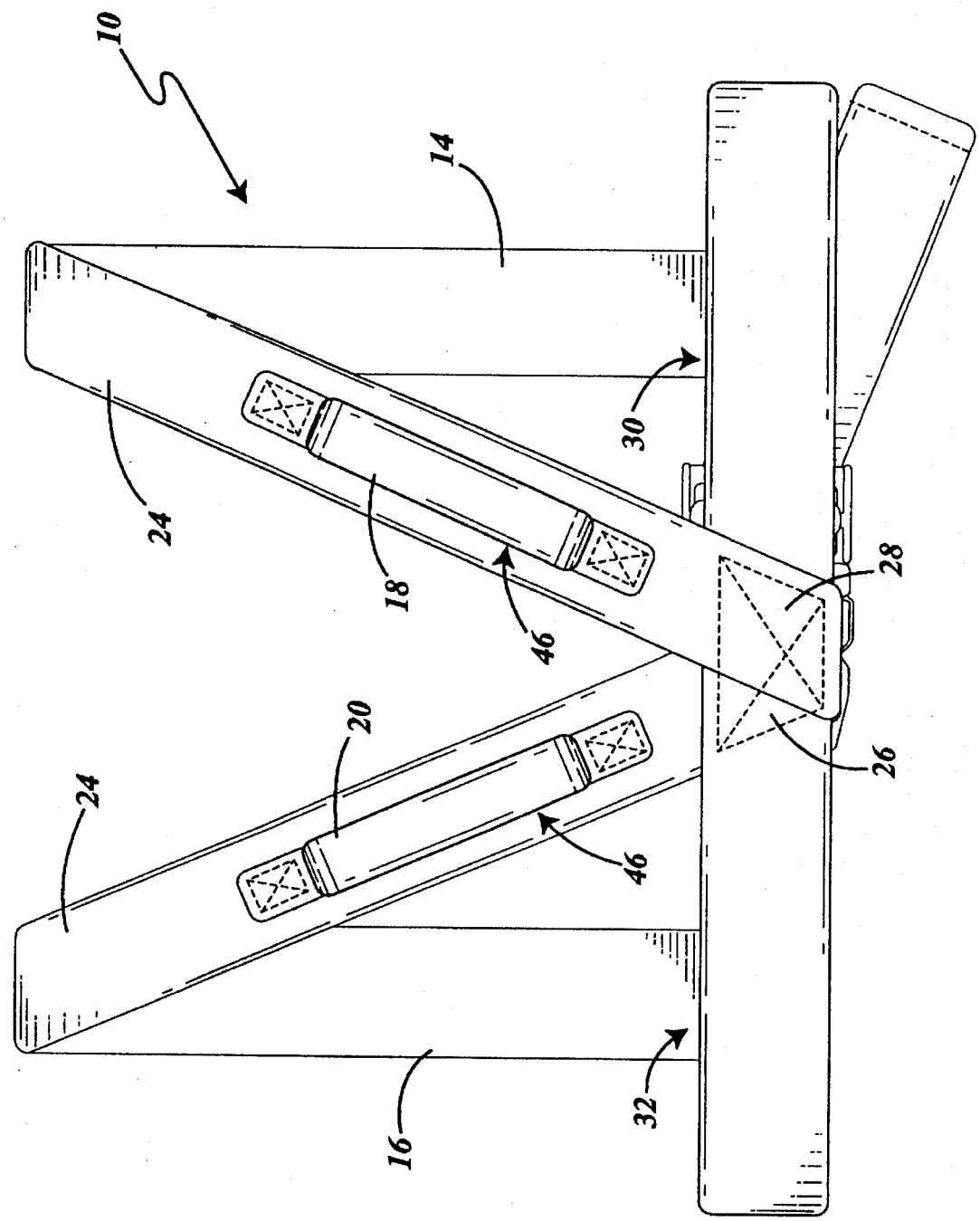
FIG. 3 is a back elevational view of the harness of the type shown in FIG. 1.
Figure 4:
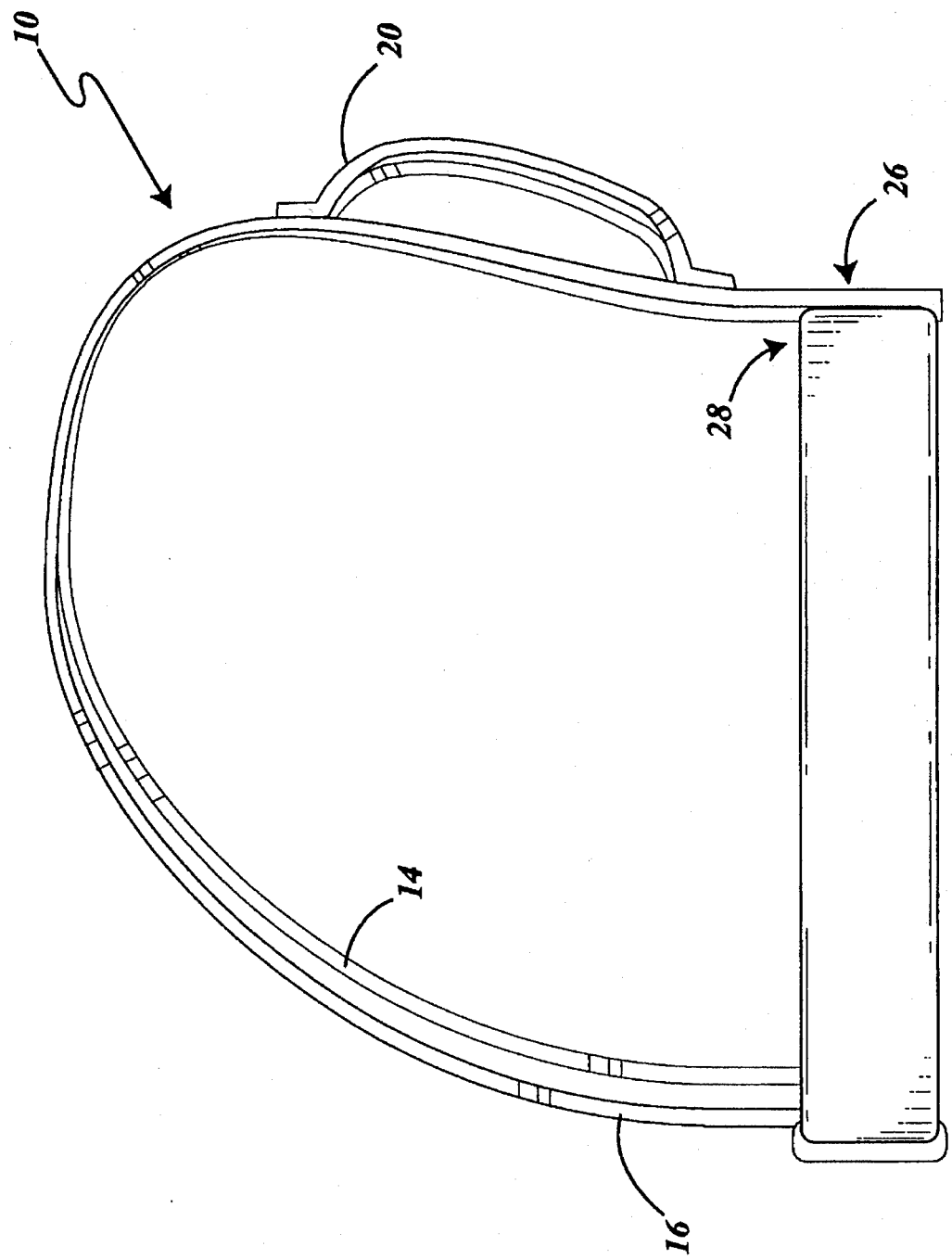
FIG. 4 is a side elevational view of the harness of the type shown in FIG. 1.

Referring next to FIGS. 3 and 4, the right and left handles 18 and 20 are shown attached to the right and left shoulder straps 14 and 16 respectively. As mentioned above, the handles are preferably constructed of a nylon webbing and are sewn to the shoulder straps 14 and 16. The handles 18 and 20 are positioned and extend from the shoulder straps 14 and 16, wherein the lower end 46 of each handle is positioned near the midpoint 26 of the torso belt 22.

When the harness 10 is worn, the clasp is positioned across the chest of the operator, allowing the operator to efficiently adjust the effective length of the torso belt 12. Also, the handles 18 and 20 are aligned with the shoulder blades of the operator wearing the harness 10. When a passenger pulls on the handles 18 and 20, the positioning of the torso belt 12, shoulder straps 14 and 16, and handles 18 and 20, as previously described, provides a stable gripping surface. Also, attaching the left and right straps to a common midpoint further aids in stabilizing the harness. Further, the positioning also allows the tandem passenger to be positioned closer to the operator while comfortably gripping the handles 18 and 20.

Having described the constructional features of the harness gripping aid, the mode of use will now be discussed. With the male and female halves 34 and 36 of the clasp 22 disconnected, the operator places the right arm through the opening formed by the right shoulder strap 14 and the torso belt 12. Likewise, the left arm is extended through the opening formed by the left shoulder strap and the torso belt 12. The effective length of the torso belt is then adjusted so that the male and female halves 34 and 36 of the clasp 22 may be engaged. Both halves of the clasp are engaged and the effective length of the torso belt is adjusted, wherein the torso belt 12 fits snugly around the chest (upper torso region—see FIG. 5). A tandem passenger grips onto the handles 18 and 20 of the harness 10. When the passenger grips onto the handles 18 and 20, the force against the handles is transferred to the operators upper torso and upper back rather than the lower torso and lower back. Additionally, the tandem rider may sit closer to the operator reducing the leverage and subsequently the forces applied against the handles.

This invention has been described herein in considerable detail in order to comply with the patent statutes and to provide those skilled in the art with the information needed to apply the novel principles and to construct and use such specialized components as required. However, it is to be understood that the invention can be carried out by specifically different devices, and that various modifications, both as to the equipment details and the operating procedures, can be accomplished without departing from the scope of the invention itself.

What is claimed is:

1. A harness gripping aid for tandem riders worn by the driver of a vehicle, comprising:
    (a) a torso belt worn around a driver's upper torso region, having a first and second end;
    (b) a shoulder strap having a mid region affixed to a middle portion of said torso belt, a first end of said shoulder strap being affixed to said torso belt proximate said first end of said torso belt, and a second end of said shoulder strap being affixed to said torso belt proximate said second end of said torso belt;
    (c) handles attached and extending from said shoulder strap, each of said handles extending from said shoulder strap proximate the middle portion of said torso belt; and
    (d) a clasp to hold the first and second ends of said torso belt together, thereby allowing a length of the torso belt to be adjusted.

2. The harness gripping aid for tandem riders as recited in claim 1, wherein said clasp is adjustable, thereby allowing a length of the torso belt to be adjusted.

3. The harness gripping aid for tandem riders as recited in claim 2, wherein said clasp is of a quick release type.

4. The harness gripping aid for tandem riders as recited in claim 2, wherein the harness gripping aid is formed of a nylon webbing.

5. The harness gripping aid for tandem riders as recited in claim 1, wherein said clasp is of a quick release type.

6. The harness gripping aid for tandem riders as recited in claim 5, wherein the harness gripping aid is formed of a nylon webbing.

7. The harness gripping aid for tandem riders as recited in claim 1, wherein the harness gripping aid is formed of a nylon webbing.

* * * * *